United States Patent [19]
Arnold et al.

[11] Patent Number: 5,998,550
[45] Date of Patent: Dec. 7, 1999

[54] PROCESSING OF THERMOSET RIGID-ROD MOLECULAR COMPOSITES

[75] Inventors: Fred E. Arnold, Centerville; Narayanan Venkatasubramanian, Bellbrook; Thuy D. Dang, Centerville; Derrick R. Dean, Akron, all of Ohio

[73] Assignee: The United States of America as represented by the Secretary of the Air Force, Washington, D.C.

[21] Appl. No.: 09/126,568

[22] Filed: Jul. 30, 1998

[51] Int. Cl.$^6$ .......................... C08G 73/18; C08G 75/32; C08L 79/06; C08L 79/04
[52] U.S. Cl. .......................... 525/420; 525/417; 525/421; 525/422; 525/426; 525/434; 525/435; 525/436
[58] Field of Search ..................................... 525/420, 421, 525/422, 426, 434, 435, 436, 417

[56] References Cited

U.S. PATENT DOCUMENTS

| | | |
|---|---|---|
| 4,207,407 | 6/1980 | Helminiak et al. . |
| 4,377,546 | 3/1983 | Helminiak et al. . |
| 4,631,318 | 12/1986 | Hwang et al. . |
| 4,749,753 | 6/1988 | Nishihara et al. . |
| 4,972,028 | 11/1990 | Uy . |
| 4,977,223 | 12/1990 | Arnold et al. . |
| 5,086,120 | 2/1992 | Tan et al. . |
| 5,095,075 | 3/1992 | Arnold et al. . |
| 5,217,809 | 6/1993 | Hwang et al. . |
| 5,233,073 | 8/1993 | Tan et al. . |
| 5,247,057 | 9/1993 | Tan et al. ................................. 528/353 |
| 5,312,876 | 5/1994 | Dang et al. . |
| 5,344,896 | 9/1994 | Dang et al. . |
| 5,508,376 | 4/1996 | Dang et al. . |

OTHER PUBLICATIONS

Ning, X. and Ishida, H., Journal of Polymer Science: Part A: Polymer Chemistry, vol. 32, 1121–1129 (1994).
Ning, X. and Ishida, H., Journal of Polymer Science: Part B: Polymer Physics, vol. 32, 921–927 (1994).
Tan, L–S and Arnold, F.E., Polymer Preprints, vol. 32, No. 1, 636–637 (Mar., 1991).

*Primary Examiner*—Ana Woodward
*Attorney, Agent, or Firm*—Charles E. Bricker; Thomas L. Kundert

[57] ABSTRACT

Molecular dispersions of rigid-rod polybenzobisazole polymer/copolymer in thermosetting matrices in a weight ratio of about 1:99 to 50:50 are prepared by dissolving the rigid-rod polymer in an alcoholic or aprotic solvent, dissolving the thermosetting polymer in an alcoholic or aprotic solvent, combining the two solutions and recovering the resulting molecular composite from the combined solution. These molecular dispersions consist essentially of rigid-rod polybenzobisazole polymer/copolymer having sulfonic acid groups pendant to the polymer/copolymer backbone and thermosetting polymers selected from the group consisting of iminobis(N-propyl-2-phenylethynyl-phthalimide), N-ethyl-(2,6-di-benzocyclobutenoxy)benzylamine, iminobis(N-propylnadic imide) and difunctional benzoxazine monomers of the formula

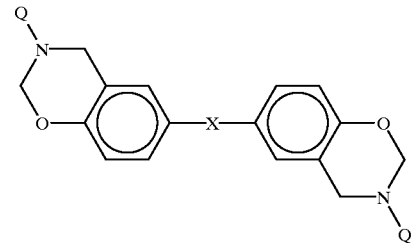

wherein X is a single bond, —CO— or —C(CH$_3$)$_2$— and Q is —CH$_3$ or —C$_6$H$_5$.

13 Claims, No Drawings

PROCESSING OF THERMOSET RIGID-ROD MOLECULAR COMPOSITES

RIGHTS OF THE GOVERNMENT

The invention described herein may be manufactured and used by or for the Government of the United States for all governmental purposes without the payment of any royalty.

BACKGROUND OF THE INVENTION

The present invention relates to polymeric composites of rigid-rod aromatic heterocyclic polymers and thermosetting polymers and a method for the preparation of composite articles with rigid-rod aromatic heterocyclic polymers molecularly dispersed in a continuous thermosetting polymeric matrix.

Polybenzobisazole polymers, and particularly the so-called "rigid rod" benzobisazole polymers, are noted for high tensile strength, high tensile modulus and high thermal stability. However, many benzazole polymers are difficult to fabricate into useful articles. Rigid and semi-rigid polybenzobisazoles do not have glass transition temperatures at any temperature at which they are stable. Therefore, the polymers are ordinarily spun from solution to form fibers, which serve as reinforcement within a thermosetting matrix, such as epoxy resins, to form composites. However, the fibers and the cured composites are not moldable or thermoformable.

Many moldable and thermoformable polymers are known. Exemplary polymers include thermoplastic polyamides, polyimides, polyquinolines, polyquinoxalines, poly(aromatic ether ketones) and poly(aromatic ether sulfones). However, those polymers do not have the high tensile strength and modulus which are characteristic of polybenzobisazole polymers.

Attempts have been made to synthesize articles which combine the processability of the thermoplastic polymer with the superior mechanical properties of the polybenzobisazole polymers. To this end, molecular composites of rigid rod polybenzobisazole and flexible polymers have been studied. A molecular composite is defined as a molecular dispersion of a rigid-rod polymer in a flexible polymer matrix such that the rigid-rod polymer acts as the reinforcing elements. To ensure molecular dispersion of the rigid-rod polymer in the blend, processing of the composite can only be carried out from solution at a concentration lower than the critical concentration, $C_{cr}$, to prevent segregation of the rigid-rod reinforcement. At a concentration above $C_{cr}$, the solution becomes biphasic where the rigid-rod segregates into liquid crystalline domains which are dispersed in an entangled flexible matrix. Such molecular composites are described in numerous references, such as Helminiak et al, U.S. Pat. No. 4,207,407, issued Jun. 10,1980; Helminiak et al, U.S. Pat. No. 4,377,546, issued Mar. 22, 1983; Hwang et al, U.S. Pat. No. 4,631,318, issued Dec. 23, 1986;Nishihara et al, U.S. Patent 4,749,753, issued Jun. 7, 1988; Uy, U.S. Pat. No. 4,972,028, issued Nov. 20,1990; Arnold et al, U.S. Pat. No. 4,977,223, issued Dec. 11, 1990; Tan et al, U.S. Pat. No. 5,086,120, issued Feb. 4, 1992; Arnold et al, U.S. Pat. No. 5,095,075, issued Mar. 10,1992 and Hwang et al, U.S. Pat. No. 5,217,809, issued Jun. 8, 1993.

However, polybenzobisazoles, and particularly rigid-rod polybenzobisazoles, are incompatible with many polymers. For example, when dopes containing polybenzobisazole and a thermosetting polymer are coagulated, the thermoset agglomerates and/or phase separates. The resulting shaped articles either have poorer properties in all directions than the corresponding thermoplastic alone, or have superior properties in one direction and inferior properties in all other directions. Such compositions may be useful for fibers, but not for molded articles.

What are needed are materials and processes which can be used to make molded articles containing reinforcing amounts of polybenzobisazole polymers which have superior properties in at least two dimensions and/or are not substantially phase separated.

Accordingly, it is an object of the present invention to provide molecular dispersions of rigid-rod polybenzobisazole polymer in a thermosetting matrix.

It is another object of the present invention to provide molecular dispersions of rigid-rod polybenzobisazole polymer in a thermosetting matrix above the critical concentration to a degree at which the polymer blend can be cast from solution.

It is yet another object of the present invention to provide a method for preparing molecular dispersions of rigid-rod polybenzobisazole polymer in a thermosetting matrix above the critical concentration to a degree at which the polymer blend can be cast from solution.

Other objects, aspects and advantages of the present invention will be apparent to those skilled in the art from a reading of the following detailed disclosure of the invention.

SUMMARY OF THE INVENTION

In accordance with the present invention there are provided molecular dispersions of rigid-rod polybenzobisazole polymer/copolymer in thermosetting matrices in a weight ratio of about 1:99 to 50:50. These molecular dispersions consist essentially of rigid-rod polybenzobisazole polymer/copolymer having sulfonic acid groups pendant to the polymer/copolymer backbone and thermosetting polymers as defined hereinafter. The rigid-rod polybenzobisazole polymers/copolymers having sulfonic acid groups pendant to the polymer/copolymer backbone are soluble in alcoholic and aprotic solvents when solubilized with an organic tertiary amine.

DETAILED DESCRIPTION OF THE INVENTION

The rigid-rod polybenzobisazole polymers and copolymers suitable for use in the present invention are disclosed in the following U.S. Pat. Nos. 5,312,876, issued May 17, 1994 to Dang et al; 5,344,896, issued Sep. 6,1994 to Dang et al; and 5,508,376, issued Apr. 16,1996 to Dang et al, which are incorporated by reference herein.

Dang et al, U.S. Pat. No. 5,508,376, disclose polymers and copolymers having repeating units of the formulae I or II, below:

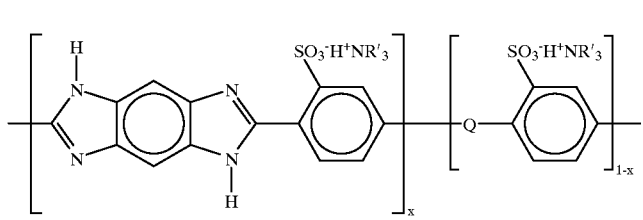

wherein x has a value of 0.0 to 1.00 and Q is a benzobisazole of the formula:

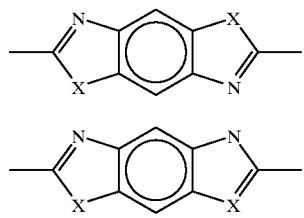

wherein X is —O— or —S—; and

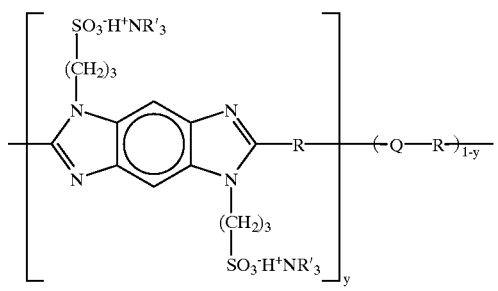

wherein y has a value of 0.05 to 1.00; Q is as described above; R′″ is selected from the group consisting of:

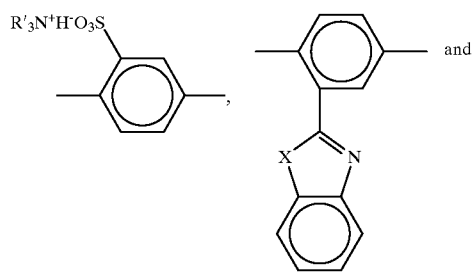

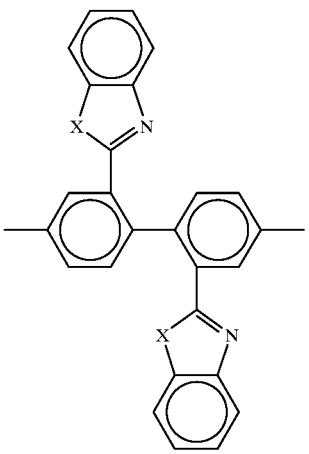

and R′ is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl, phenylethynyl, and the like. Examples of suitable alkyl groups include methyl, ethyl, butyl and the like; suitable alkaryl and aralkyl groups include benzyl, tolyl, and the like; suitable substituted aromatic groups include nitroaniline, ethynylaniline, phenylethynylaniline and the like. Referring to formula I, above, the polymer where x is 1.0, prior to solubilization with an amine, is hereinafter referred to as 2-sulfo-PBI.

Dang et al, U.S. Pat. Nos. 5,312,876 and 5,344,896 disclose polymers and copolymers having repeating units of the formula:

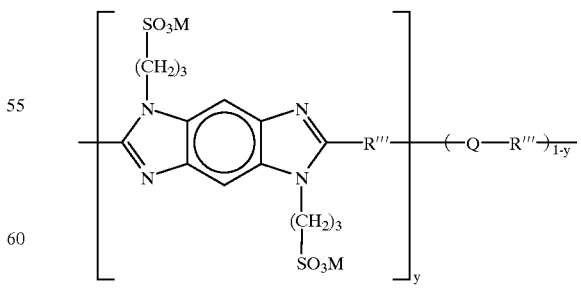

wherein y has a value of 0.05 to 1.00, M is an alkali metal and Q is a benzobisazole as described above; and R′″ is selected from the group consisting of:

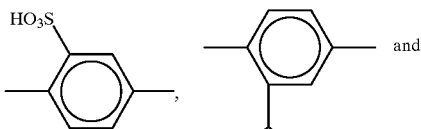

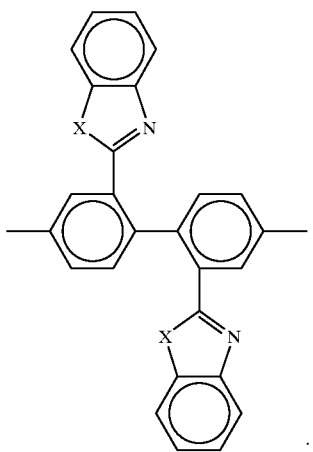

Another rigid-rod polymer that can be employed in the current invention has repeating units of the formula:

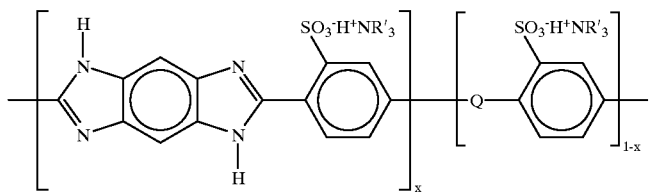

wherein x, Q and R' are as described previously.

The polymers set forth above are soluble in alcoholic and aprotic solvents when solubilized with an organic tertiary amine. Such solubilization is accomplished by adding an organic tertiary amine to an alcoholic suspension of the polymer. Suitable alcohols include methyl, ethyl, propyl and butyl alcohols. Suitable aprotic solvents include N,N-dimethylacetamide (DMAC), dimethylsulfoxide (DMSO), N,N-dimethylformamide (DMF) and N-methyl-2-pyrrolidone (NMP). Suitable organic tertiary amines have the formula NR'$_3$, wherein R' is as previously defined. The quantity of organic tertiary amine is generally a stoichiometric amount, although a greater quantity may be employed. The rate of solubilization of the polymer may be increased by heating the mixture to reflux.

The thermosettable matrices suitable for use in the present invention are benzoxazines and secondary amines as hereinafter described. The benzoxazine matrices suitable for use in the present invention are described in Ning, X. and Ishida, H. Journal of Polymer Science: Part A: Polymer Chemistry, vol. 32, 1121–1129 (1994) and Ning, X. and Ishida, H. Journal of Polymer Science: Part B: Polymer Physics, vol. 32, 921–927 (1994). These compounds are difunctional benzoxazine monomers:

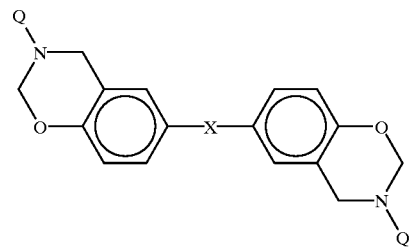

wherein X is a single bond, —CO— or —C(CH$_3$)$_2$— and Q is —CH$_3$ or —C$_6$H$_5$. These compounds form cross-linked structures characteristic of phenolic materials through a ring-opening reaction mechanism, with glass transition temperatures over 200° C.

The secondary amine matrices suitable for use in the present invention are disclosed in Tan, L-S and Arnold, F.E., Polymer Preprints, vol. 32, no.1, 636–637 (1991):

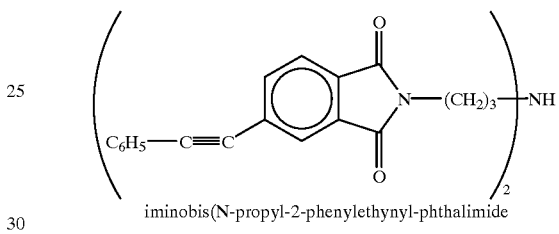

iminobis(N-propyl-2-phenylethynyl-phthalimide and Tan et al, U.S. Pat. No. 5,233,073, issued Aug. 3, 1993:

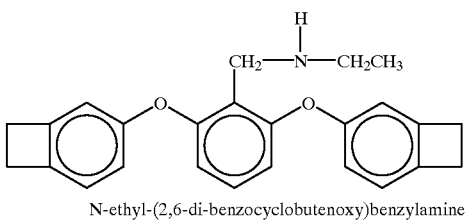

N-ethyl-(2,6-di-benzocyclobutenoxy)benzylamine and

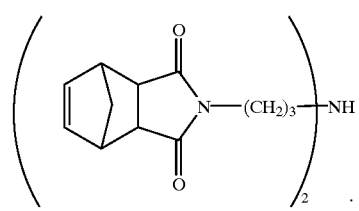

iminobis(N-propylnadic imide)

The polymeric composites of this invention are prepared as follows: First, solutions of the rigid-rod polymer and the matrix polymer are prepared. Next, the two solutions are combined and, finally, the resulting polymeric composite is recovered from solution.

The solutions of the rigid-rod polymer and the matrix polymer can be prepared by the skilled artisan following procedures known in the art, together with the general guidelines given heretofore as well as the examples which follow. The concentrations of these solutions should be consistent with ease of handling and desired results. The rigid-rod polymer and matrix polymer solutions are then combined in a desired ratio. Upon mixing these solutions, by a process of ionic interchange, the basic thermoset replaces the tertiary amine, so that the rigid-rod polymer remains in solution.

The resulting molecular composite can be recovered by (a) removing the solvent or (b) coagulating the composite in a nonsolvent. Under either approach, it is preferred practice to heat the composite solution to an elevated temperature determined by the solvent(s) used, under a nitrogen purge to facilitate evaporation of the solvent and the tertiary amine. For example, when using methanol as the solvent and triethyl amine as the tertiary amine, the composite solution may be heated to about 60°–80° C. for several hours to remove the volatile components. It may be necessary to add solvent back to the solution to prevent the concentrated solution from gelling, keeping the polymer blend in homogeneous solution until the solution is free of the tertiary amine.

To recover the composite by removing the solvent, the solution is transferred to a casting dish and the solvent is completely removed, using elevated temperature and/or vacuum, as necessary, leaving a film of molecular composite.

To recover the composite by coagulation, the solution is poured or otherwise transferred to an excess of nonsolvent for the polymer(s), such as distilled water, to precipitate the composite as a fine aggregate. The resulting aggregate is then filtered, washed and dried. The filtered and washed aggregate may be extracted with the nonsolvent to ensure complete removal of the solvent, then dried.

The following examples illustrate the invention:

EXAMPLE I

Methanol soluble 2-sulfo-PBI composition

2-Sulfo-PBI (1.5 g) (IV=7.0 dl/g) was suspended in 300 mL of anhydrous methyl alcohol a large molar excess (4.0 g) of triethylamine was added to the red suspension. Solution of the polymer started to occur and the solubilization was completed under methanol reflux conditions in a dry nitrogen atmosphere overnight. A clear, greenish yellow solution of the trimethylammonium salt of 2-sulfo-PBI in methanol was obtained. Various volumes of this solution were used for the formation of thermoset rigid-rod film blends of different compositions. The weight of the polymer in solution was approximately 0.5%.

EXAMPLE II

Molecular Composite Film from 2-sulfo-PBI and nadimide with 42/58 w/w rod/thermoset composition To 20 mL methanolic solution of the triethylammonium salt of 2-sulfo-PBI (0.01 g of the polymer) from example I was added 10 mL methanolic solution containing 0.014 g of iminobis(N-propylnadic imide). The homogenous, yellowish orange solution was heated on a hot oil bath in the temperature range of 60–80°C. for several hours, driving off the volatile methanol and triethlamine; the blend solution in methanol was concentrated to a viscous solution. The solution was transferred to a glass casting dish and the volatiles were evaporated overnight in the hood (partial vacuum). A homogeneous, yellowish orange film was obtained and isolated. This film corresponded to a 42/58 rod/thermoset w/w composition.

EXAMPLE III

Molecular Composite Film from 2-sulfo-PBI and nadimide with 20/80 w/w rod/thermoset composition To 20 mL methanolic solution of the triethylammonium salt of 2-sulfo-PBI (0.01 g of the polymer) from example I was added 10 mL methanolic solution containing 0.042 g of iminobis(N-propylnadic imide). The homogenous, yellowish orange solution was heated on a hot oil bath in the temperature range of 60–80° C. for several hours, driving off the volatile methanol and triethylamine; the blend solution in methanol was concentrated to a viscous solution. The solution was transferred to a glass casting dish and the volatiles were evaporated overnight in the hood (partial vacuum). A homogeneous, yellowish orange film was obtained and isolated. This film corresponded to a 20/80 rod/thermoset w/w composition.

EXAMPLE IV

Molecular Composite Film from 2-sulfo-PBI and phenylethynyl with 36/64 w/w rod/thermoset composition To 20 mL methanolic solution of the triethylammonium salt of 2-sulfo-PBI (0.01 g of the polymer) from example I was added 10 mL methanolic solution containing 0.018 g of iminobis(N-propyl-2-phenylethynyl-phthalimide). The homogenous, yellowish orange solution was heated on a hot oil bath in the temperature range of 60–80° C. for several hours, driving off the volatile methanol and triethylamine; the blend solution in methanol was concentrated to a viscous solution. The solution was transferred to a glass casting dish and the volatiles were evaporated overnight in the hood (partial vacuum). A homogeneous, yellowish orange film was obtained and isolated. This film corresponded to a 36/64 rod/thermoset w/w composition.

EXAMPLE V

Molecular Composite Film from 2-sulfo-PBI and benzoxazine with 48/52 w/w rod/thermoset composition To 20 mL methanolic solution of the triethylammonium salt of 2-sulfo-PBI (0.01 g of the polymer) from example I was added 10 mL methanolic solution containing 0.023 g of 2,2-bis(3,4-dihydro-3-methyl-2H-1,3-benzoxazine)propane. The homogenous, yellowish orange solution was heated on a hot oil bath in the temperature range of 60– 80° C. for several hours, driving off the volatile methanol and triethylamine; the blend solution in methanol was concentrated to a viscous solution. The solution was transferred to a glass casting dish and the volatiles were evaporated overnight in the hood (partial vacuum). A homogeneous, yellowish orange film was obtained and isolated. This film corresponded to a 48/52 rod/thermoset w/w composition.

EXAMPLE VI

Testing of Composites

Solvent cast, homogenous, optical clear film composites from 2-sulfo-PBI and thermosets were obtained. Miscibility of the blends was demonstrated in various ranges of film compositions (20/80 w/w rod/matrix to 48/52 w/w rod/matrix). The color of the composite films ranged from yellow to reddish yellow while the 2-sulfo PBI film was red. The 2-sulfo-PBI/nadimide and 2-sulfo-PBI/benzoxazine films were thermally cured at 250° C. for 1 hour under nitrogen. Small angle X-ray scattering and scanning electron microscopy showed no phase separation in rigid-rod/thermoset composite films (before and after curing).

EXAMPLE VII

Preparation of poly(1,7-dihydropyrimido(1,2-d:4.5-d') diimadazo-2.6-diyl(2-(2-sulfo)-p-phenylene))

In a 150 mL resin flask equipped with a mechanical stirrer, nitrogen inlet/outlet, and pressure regulator, was placed 3.6930 g (15.0 mmol) of 2-sulfoterephthalic acid, 3.9983 g (15.0 mmol) of 1,2,4,5-tetraaminopyridine trihydrochloride monohydrate, and 8.67 g polyphosphoric acid (PPA) (77% $P_2O_5$). The resulting mixture was dehydrochlorinated under reduced pressure (176 mm) while heating slowly to 65° C. The reaction temperature was maintained at 65° C. for 16 hr, raised to 80° C. for 4 hr, then cooled to 60° C. and 10.97 g of $P_2O_5$ was added to the mixture to bring the polymer concentration to 18%. The mixture was headed under a nitrogen atmosphere at 60° C. for 2 hr, 100° C. for 16 hr and 170° C. for 16 hr. As the temperature increased, stir opalescence began to occur at about 165° C. The mixture was finally heated to 190° C. for 16 hr. The polymer was precipitated in water, broken up with a blender, collected by suction filtration, washed with water and dried under reduced pressure (0.05 mm) at 1 00C. The polymer exhibited an intrinsic viscosity of 17 dl/g in methanesulfonic acid at 30° C.

Various modifications may be made to the invention as described without departing from the spirit of the invention or the scope of the appended claims.

We claim:

1. A method for preparing a molecular composite consisting essentially of a rod-like aromatic heterocyclic polymer and a thermosettable matrix in a weight ratio of about 1:99 to 50:50, wherein said rod-like polymer is a polybenzobisazole polymer having sulfonic acid groups pendant to the polymer backbone and said thermosettable matrix is selected from the group consisting of iminobis(N-propyl-2-phenylethynyl-phthalimide), N-ethyl-(2,6-di-benzocyclobutenoxy)benzylamine, iminobis(N-propylnadic imide), and difunctional benzoxazine monomers of the formula:

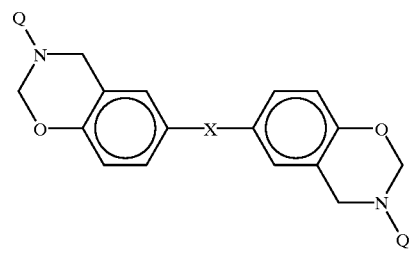

wherein X is a single bond, —CO— or —C(CH$_3$)$_2$— and Q is —CH$_3$ or —C$_6$H$_5$; which comprises the steps of:
(a) dissolving the rod-like polymer in an alcoholic or aprotic solvent;
(b) dissolving the thermosettable matrix in an alcoholic or aprotic solvent;
(c) combining the solutions resulting from steps (a) and (b); and
(d) recovering the resulting molecular composite from the combined solution of step (c).

2. The method of claim 1 wherein said rod-like polymer has repeating units of the formula:

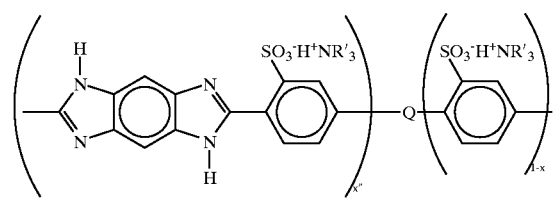

wherein x has a value of 0.0 to 1.00 and Q is a benzobisazole of the formula:

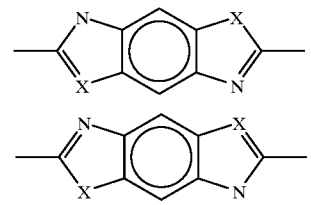

wherein X is —O— or —S—; and and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl.

3. The method of claim 2 wherein said rod-like polymer is 2-sulfo-polybenzimide and said thermosettable matrix is iminobis(N-propylnadic imide).

4. The method of claim 3 wherein the weight ratio of rod-like polymer to thermosettable matrix is 42:58.

5. The method of claim 3 wherein the weight ratio of rod-like polymer to thermosettable matrix is 20:80.

6. The method of claim 2 wherein said rod-like polymer is 2-sulfo-polybenzimide and said thermosettable matrix is iminobis(N-propyl-2-phenylethynyl-phthalimide).

7. The method of claim 6 wherein the weight ratio of rod-like polymer to thermosettable matrix is 36:64.

8. The method of claim 2 wherein said rod-like polymer is 2-sulfo-polybenzimide and said thermosettable matrix is 2,2-bis(3,4-dihydro-3-methyl-2H-1,3-benzoxazine)propane.

9. The method of claim 8 wherein the weight ratio of rod-like polymer to thermosettable matrix is 48:52.

10. The method of claim 1 wherein said rod-like polymer has repeating units of the formula:

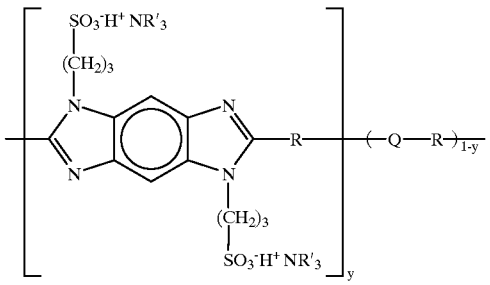

wherein y has a value of 0.05 to 1.00; Q is a benzobisazole of the formula:

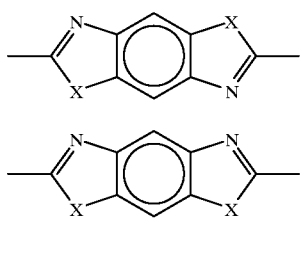

wherein R is selected from the group consisting of:

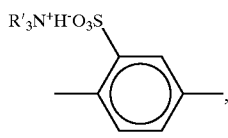

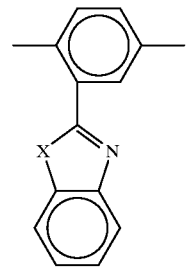

and

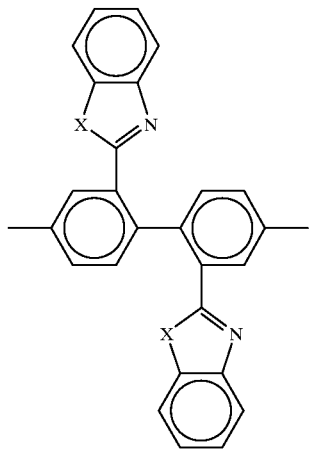

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl; and wherein X is —O— or —S—.

11. The method of claim 1 wherein said rod-like polymer has repeating units of the formula:

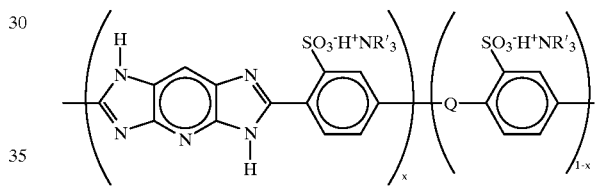

wherein x has a value of 0.0 to 1.00 and Q is a benzobisazole of the formula:

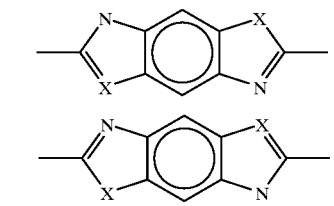

wherein X is —O— or —S—; and and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl.

12. The method of claim 1 wherein said rod-like polymer has repeating units of the formula:

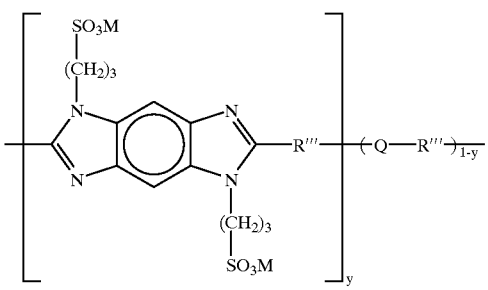
wherein y has a value of 0.05 to 1.00, M is an alkali metal and Q is a benzobisazole of the formula:
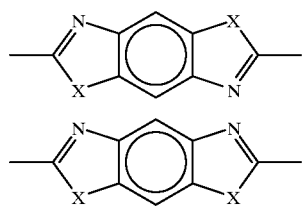
wherein R''' is selected from the group consisting of:
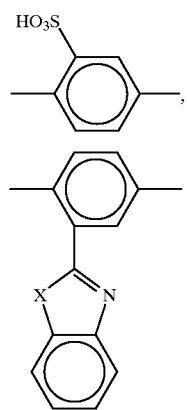
-continued
and
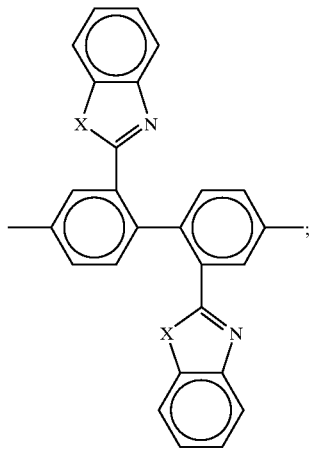
and wherein X is —O— or —S—.
13. The method of claim 12 wherein said rod-like polymer is solubilized in step (a) by adding an organic tertiary amine to a suspension of said polymer in said solvent.
* * * * *